US008388216B2

(12) United States Patent
Lechner et al.

(10) Patent No.: US 8,388,216 B2
(45) Date of Patent: Mar. 5, 2013

(54) METHOD AND PROCESSING INSTALLATION FOR DEVOLATILIZING POLYMER MELTS

(75) Inventors: Frank Lechner, Karlsruhe (DE); Ulrich Conrad, Elze (DE)

(73) Assignee: Coperion GmbH, Stuttgart (DE)

( * ) Notice: Subject to any disclaimer, the term of this patent is extended or adjusted under 35 U.S.C. 154(b) by 260 days.

(21) Appl. No.: 13/013,713

(22) Filed: Jan. 25, 2011

(65) Prior Publication Data
US 2011/0182132 A1 Jul. 28, 2011

(30) Foreign Application Priority Data

Jan. 27, 2010 (EP) .................................. 10151776

(51) Int. Cl.
B29B 7/46 (2006.01)
B29C 47/50 (2006.01)

(52) U.S. Cl. ............... 366/75; 366/80; 366/86; 366/87; 366/91; 366/290; 425/205

(58) Field of Classification Search .................. 366/75, 366/79, 80, 83–87, 91, 96–99, 318, 290, 366/291; 425/192 R, 190, 186, 204, 205, 425/208
See application file for complete search history.

(56) References Cited

U.S. PATENT DOCUMENTS

| 3,346,919 | A | 10/1967 | Okzakl |
| 5,804,111 | A | 9/1998 | Kobayashi et al. |
| 6,024,479 | A | 2/2000 | Haring |
| 7,041,780 | B2 | 5/2006 | Buckley et al. |

(Continued)

FOREIGN PATENT DOCUMENTS

| AT | 411235 B | 11/2003 |
| DE | 231 029 A1 | 12/1985 |

(Continued)

OTHER PUBLICATIONS

English translation of Claim 1 of German Utilty Model DE 298 09 023 U1, Aug. 1998.

(Continued)

*Primary Examiner* — Charles E Cooley
(74) *Attorney, Agent, or Firm* — James B. Conte; Husch Blackwell LLP (57) ABSTRACT

A processing installation for devolatilization of polymer melts comprises a first extruder and a second extruder arranged downstream thereof in a direction of conveyance. The first extruder comprises several rotatably drivable first shafts which are provided with first treatment members and several devolatilization zones with associated devolatilization ports. Correspondingly, the second extruder comprises several rotatably drivable second shafts which are provided with second treatment members and several second devolatilization zones with associated devolatilization ports. The first treatment members have an external diameter which is smaller than or equal to that of the second treatment members. A devolatilization unit is arranged in a transfer zone which interconnects the extruders. The devolatilization unit comprises a perforated plate and a clearance arranged downstream in the direction of conveyance. A control unit is configured in such a way that when the processing installation is operated, the speed of the second shafts is lower than the speed of the first shafts. The processing installation allows a high devolatilization performance and a high polymer throughput to be achieved at the same time. A throttle is arranged in the transfer zone upstream of the devolatilization unit when seen in the direction of conveyance, with the position of the throttle being adjustable by means of the control unit.

21 Claims, 5 Drawing Sheets

U.S. PATENT DOCUMENTS

| | | | |
|---|---|---|---|
| 7,264,460 B2 * | 9/2007 | Munz et al. | 425/205 |
| 7,438,550 B2 * | 10/2008 | Munz | 425/192 R |
| 7,547,132 B2 * | 6/2009 | Davids et al. | 366/91 |
| 7,815,360 B2 * | 10/2010 | Munz et al. | 366/91 |
| 2002/0014710 A1 * | 2/2002 | Tsuruta et al. | 264/40.6 |
| 2002/0015750 A1 * | 2/2002 | Yamaguchi et al. | 425/198 |
| 2002/0036948 A1 * | 3/2002 | Yamaguchi et al. | 366/76.3 |
| 2004/0062828 A1 * | 4/2004 | Yamaguchi et al. | 425/208 |
| 2006/0233903 A1 * | 10/2006 | Munz | 425/225 |
| 2006/0240133 A1 * | 10/2006 | Munz et al. | 425/205 |
| 2006/0245294 A1 * | 11/2006 | Burkhardt | 366/85 |
| 2007/0104814 A1 * | 5/2007 | Munz et al. | 425/205 |
| 2008/0124420 A1 * | 5/2008 | Davids et al. | 425/204 |
| 2011/0182132 A1 * | 7/2011 | Lechner et al. | 366/76.6 |

FOREIGN PATENT DOCUMENTS

| | | |
|---|---|---|
| DE | 298 09 233 U1 | 8/1998 |
| EP | 0 336 520 A1 | 10/1989 |
| GB | 1140693 | 1/1969 |
| JP | 60-124232 | 7/1985 |
| JP | 6059440 | 3/1994 |
| JP | 2002307530 A | 10/2002 |
| JP | 2003291201 A * | 10/2003 |
| WO | WO02/057065 A1 * | 7/2002 |
| WO | WO 2009/136904 A2 | 11/2009 |

OTHER PUBLICATIONS

EPO Examination Report of Feb. 6, 2012 regarding the companion European patent application No. 10 151 776.1.

European Search Report EP 10 15 1776 dated Jul. 7, 2010 (10 pages) for parent case.

English Abstract for DD 231 029 A1 (1 page), Dec. 1985.

English Abstract for JP 60-124232 (1 page), Jul. 1985.

* cited by examiner

METHOD AND PROCESSING INSTALLATION FOR DEVOLATILIZING POLYMER MELTS

BACKGROUND OF THE INVENTION

1. Field of the Invention

The invention relates to a method and a processing installation for devolatilizing polymer melts.

2. Background Art

Devolatilizing of polymer melts for improving the polymer quality is a common procedure in the industrial production of plastic materials. In this process, volatile components such as monomers, oligomers, additives required for polymerization as well as undesirable by-products impairing the quality of the polymer are devolatilized. Typical additives are for example solvents or suspending agents. The process of devolatilization allows in particular the optical and mechanical properties to be improved.

US 2006/0245294 A1 discloses a processing installation and a method for devolatilizing bimodal polyolefins. In the processing installation, two twin-shaft extruders which rotate in the same direction are arranged one behind the other, with the second extruder, seen in the direction of conveyance, having a devolatilization zone for devolatilizing the polyolefins to be processed. The drawback of this processing installation is that the devolatilization performance, in other words the amount of the devolatilized proportion of undesirable volatile components, is low.

U.S. Pat. No. 6,024,479 discloses a method and an extrusion installation for processing materials which emit large amounts of gas. The extrusion installation comprises a main extruder and two ancillary extruders opening laterally into the main extruder so that the gas flow produced in an evaporation zone of the main extruder is divided into at least three partial flows which are then discharged from the extruders. The drawback is that the material throughput in this extrusion installation is low compared to the necessary technical effort.

SUMMARY OF THE INVENTION

It is the object of the invention to provide a method for devolatilizing polymer melts which ensures a high devolatilization performance and a high polymer throughput at the same time.

This object is achieved by a method for the devolatilization of polymer melts, the method comprising the following steps: providing a processing installation comprising a first extruder which comprises several rotatably drivable first shafts which are provided with first treatment members; and several first devolatilization zones with first devolatilization ports; a second extruder arranged downstream of the first extruder in a direction of conveyance which comprises several rotatably drivable second shafts which are provided with second treatment members, with the external diameter of the first treatment members being no more than equal to the external diameter of the second treatment members; and several second devolatilization zones with second devolatilization ports; a transfer zone which interconnects the extruders; a devolatilization unit which is arranged in the transfer zone; and an adjustable throttle which is upstream of the devolatilization unit in the direction of conveyance and arranged in the transfer zone; supplying a polymer melt to the first extruder, with the first extruder being operated at a first speed of the first shafts in such a way that volatile components escape from the polymer melt via the first devolatilization ports so that the polymer melt becomes more viscous; adjusting the energy input into the polymer melt in the first extruder using the throttle; supplying the more viscous polymer melt under pressure to the devolatilization unit which comprises a perforated plate and a clearance arranged downstream in the direction of conveyance so that the polymer melt has a larger surface area in the no more than partially filled clearance after passing through the perforated plate and other volatile components escape from the polymer melt; and supplying the polymer melt being discharged from the devolatilization unit to the second extruder, with the second extruder being operated at a second speed of the second shafts, which is lower than the first speed, in such a way that other volatile components escape from the polymer melt via the second devolatilization ports. The first extruder forms a first devolatilization stage while the second extruder forms a downstream second devolatilization stage. This two-stage design of the processing installation allows a high devolatilization performance and a high polymer throughput to be achieved at the same time. The first extruder is set to a high speed of rotation as the energy input is low due to the low viscosity of the polymer melt to be devolatilized. As a result, the amount of volatile components is reduced considerably in the first devolatilization zones. The energy removed from the polymer melt due to the devolatilization process is reintroduced to the polymer melt via the first treatment members or an external heating. If the polymer melt contains an amount of volatile components of 10 to 80 wt. % when entering the first extruder, then this amount can be reduced to 2 to 20 wt. % before the polymer melt is discharged from the first extruder. Prior to entering the second extruder, the polymer melt is supplied under pressure to a devolatilization unit which is arranged in the transfer zone. In the devolatilization unit, other volatile components are released from the polymer melt, which improves and optimizes the devolatilization performance. The separated volatile components are able to escape via devolatilization ports of the devolatilization unit and/or via integrated devolatilization ports of the second extruder. Devolatilizing the volatile components increases the viscosity of the polymer melt, in other words the polymer melt becomes more viscous. In order to prevent thermal damages to the polymer melt in the further devolatilization process, the downstream second extruder is operated at a lower speed than the first extruder to avoid an excessive energy input in the second extruder. The second extruder comprises treatment members having an equal or a larger diameter than the first extruder, which allows the second extruder to continue devolatilizing the supplied polymer melt despite the lower speed whilst preventing an accumulation of polymer melt in the transfer zone. In the second devolatilization zones, other volatile components are devolatilized from the polymer melt; the energy removed from the polymer melt due to the devolatilization process can be reintroduced via the second treatment members. When discharged from the second extruder, the polymer melt contains an amount of volatile components of for example less than 10000 ppm, in particular of less than 5000 ppm. The first extruder thus forms a first stage and the second extruder forms a second stage of the devolatilization process according to the invention. The extruders are preferably closely intermeshing twin-shaft extruders which rotate in the same direction. The first extruder is preferably operated at a constant speed whereas the speed of the second extruder is adjustable.

The adjustable throttle allows control or regulation of the energy input in the polymer melt in the first extruder. This is particularly advantageous if the first extruder is operated at a substantially constant speed as the residence time of the polymer melt in the first extruder is easily adjustable by adjusting the position of the throttle and therefore the energy input.

The devolatilization unit is also referred to as extrudate devolatilization unit as the polymer melt guided through the perforated plate is in the shape of an extrudate in the downstream clearance and has a larger surface as compared to the polymer melt upstream of the perforated plate. This provides a simple manner for volatile components to be released from the polymer melt and thus to be separated therefrom. To this end, it must be ensured that the downstream clearance is preferably partially filled to prevent the polymer melt from accumulating in the clearance and from filling said clearance completely. The extruder downstream of the devolatilization unit must therefore be operated at a sufficiently high speed for a sufficient amount of the polymer melt to be discharged downstream of the devolatilization unit to prevent the polymer melt from accumulating in the clearance until said clearance is filled completely.

The polymer melts may be polymer solutions or polymer suspensions. Volatile components to be devolatilized are for example monomers, oligomers, auxiliary agents, in particular suspending agents and solvents, as well as undesirable by-products and reaction products.

A method where the polymer melt is supplied under pressure to another devolatilization unit prior to entering the first extruder allows the devolatilization performance to be increased. The devolatilization unit upstream of the first extruder is for example an extrudate devolatilization unit and/or a flash valve.

A method where the pressure for supplying the polymer melt is generated using a melt pump which is arranged upstream of the other devolatilization unit allows the polymer melt to be easily supplied to the devolatilization unit upstream of the first extruder. The melt pump is for example a gear pump.

A method where the other devolatilization unit comprises a perforated plate and a clearance arranged downstream in the direction of conveyance so that the polymer melt has a larger surface area in the no more than partially filled clearance after passing through the perforated plate and volatile components are separated from the polymer melt ensures a simple and effective devolatilization.

A method where the other devolatilization unit is designed as a pressure-relief unit for the polymer melt to be pressure-relieved when passing through the devolatilization unit and low-molecular components to be separated from the polymer melt provides a simple manner of spontaneously separating the polymer melt from the volatile components. The pressure relief unit is also referred to as flash valve. The flash devolatilization performed using the flash valve takes place in such a way that the polymer melt is heated under pressure to a temperature above the boiling point of the volatile component to be devolatilized and pressure-relieved when entering the extruder or extrudate devolatilization unit. In this process, a spontaneous separation of the polymer melt from the low molecular component(s) occurs. In particular the devolatilization unit arranged upstream of the first extruder may be designed as a flash valve.

A method where the volatile components separated in the at least one devolatilization unit escape via a devolatilization port of one of the devolatilization zones is easily performable since the volatile components separated in the devolatilization units are able to escape via the already existing devolatilization ports of the devolatilization zones.

A method where the second speed is at least three times, in particular at least four times and in particular at least five times lower than the first speed; where the first shafts are driven at a first speed of 200 to 1800 min$^{-1}$, in particular of 300 to 1500 min$^{-1}$, and in particular of 400 to 1200 min$^{-1}$; where the second shafts are driven at a second speed of 20 to 600 min$^{-1}$, in particular of 50 to 450 min$^{-1}$, and in particular of 100 to 300 min$^{-1}$; where the ratio of the external diameter of the first treatment members to the external diameter of the second treatment members is such that $0.3 \leq d_a/D_a \leq 1.0$, in particular $0.3 \leq d_a/D_a \leq 0.8$, and in particular $0.5 \leq d_a/D_a \leq 0.8$; and where the first shafts and/or the second shafts are driven equidirectionally allows the devolatilization process to be optimized depending on the polymer melt and/or the volatile components to be devolatilized.

It is another object of the invention to provide a processing installation for the devolatilization of polymer melts which allows a high devolatilization performance and a high polymer throughput to be achieved at the same time.

This object is achieved by a processing installation for devolatilization of polymer melts, the processing installation comprising a first extruder which comprises several rotatably drivable first shafts which are provided with first treatment members; and several first devolatilization zones with first devolatilization ports for volatile components contained in a polymer melt; a second extruder arranged downstream of the first extruder in a direction of conveyance, which second extruder comprises several rotatably drivable second shafts which are provided with second treatment members, with the external diameter of the first treatment members being no more than equal to the external diameter of the second treatment members; and several second devolatilization zones with second devolatilization ports for other volatile components contained in the polymer melt; a transfer zone which interconnects the extruders; a devolatilization unit which is arranged in the transfer zone and comprises a perforated plate and a clearance arranged downstream in the direction of conveyance; a control unit which is configured in such a way that a second speed of the second shafts is lower than a first speed of the first shafts; and a throttle which is arranged in the transfer zone upstream of the devolatilization unit when seen in the direction of conveyance, with the position of the throttle being adjustable by means of the control unit. The advantages of the processing installation according to the invention correspond to the advantages of the method according to the invention already described above. The processing installation may in particular be developed in such a way as to have the features of the claimed method for the devolatilization of polymer melts. The adjustable throttle provides a simple manner of controlling or regulating the energy input into the polymer melt in the first extruder.

A processing installation where another devolatilization unit is arranged upstream of the first extruder in the direction of conveyance has an increased devolatilization performance.

Further features, advantages and details of the invention will become apparent from the ensuing description of several embodiments.

DESCRIPTION OF THE PREFERRED EMBODIMENTS

The following is a description of a first embodiment of the invention with reference to FIGS. 1 to 4. A processing installation 1 comprises a first extruder 2 and a second extruder 4 arranged downstream in a direction of conveyance 3. The first extruder 2 is arranged above the second extruder 4. The first extruder 2 is driven by means of a first drive motor 5 via a first clutch 6 and a first gear 7. Correspondingly, the second extruder 4 is driven by means of a second drive motor 8 via a second clutch 9 and a second gear 10. The drive motors 5 and 8 are controlled via a control unit 11.

Figure 1:
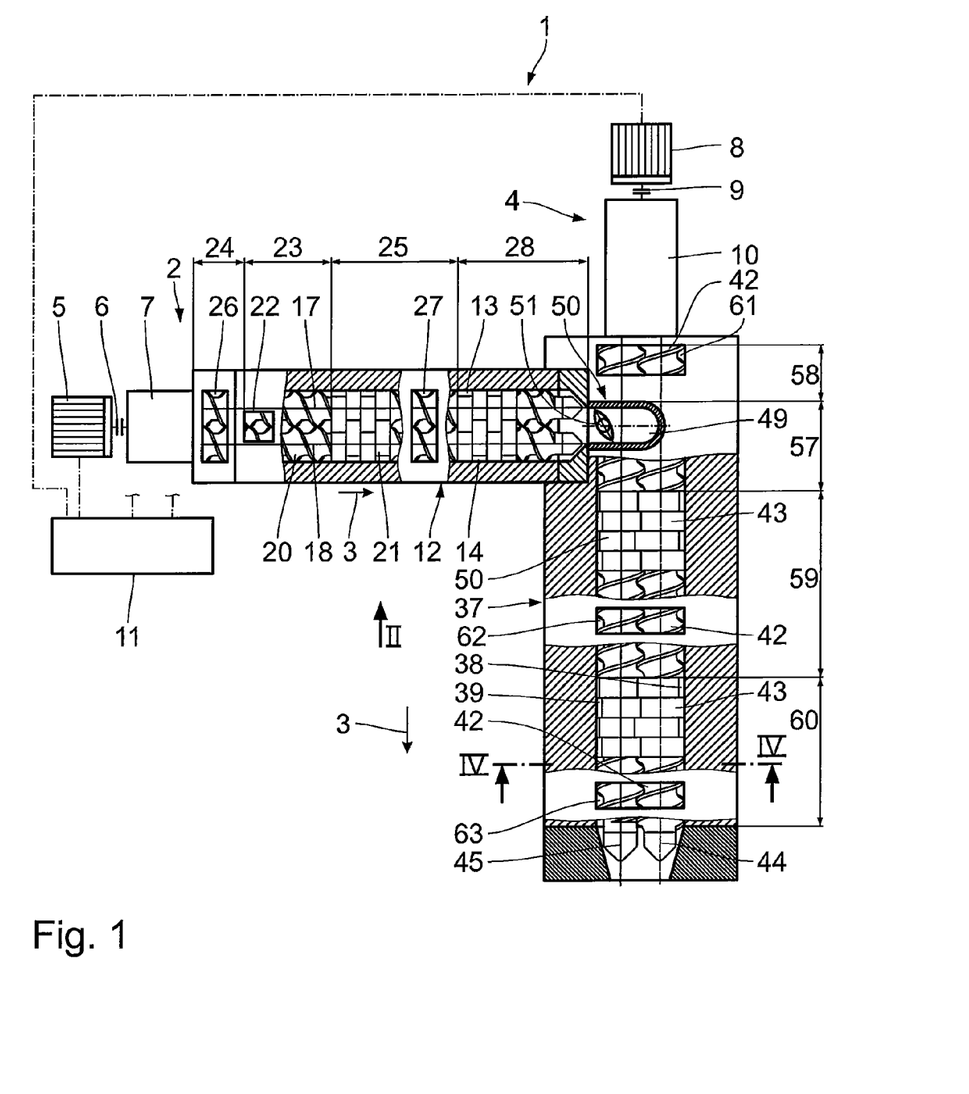
FIG. 1 is a plan view of a processing installation according to a first embodiment with extruders being shown in a cutaway view.
Figure 3:
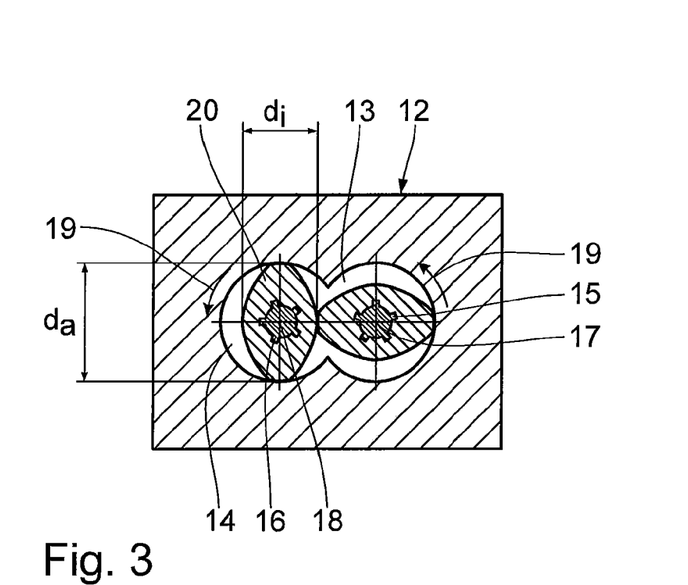
FIG. 3 is a cross-section through a first extruder according to cutting line III-III in FIG. 2.

The first extruder 2 comprises a casing 12 in which two first casing bores 13, 14 are formed which are parallel to each other and intermesh with each other in the manner of a lying figure eight. In these casing bores 13, 14, two first shafts 15, 16 are arranged which are coupled to the first gear 7. The first shafts 15, 16 are driven equidirectionally, in other words in the same direction of rotation 19, about parallel first axes of rotation 17, 18.

The first shafts 15, 16 are provided with first treatment members in the form of first screw members 20 and first kneading members 21. The treatment members 20, 21 are designed such as to closely intermesh with each other and are self-cleaning. The treatment members 20, 21 have a first core diameter $d_i$ and a first external diameter $d_a$.

Figure 2:
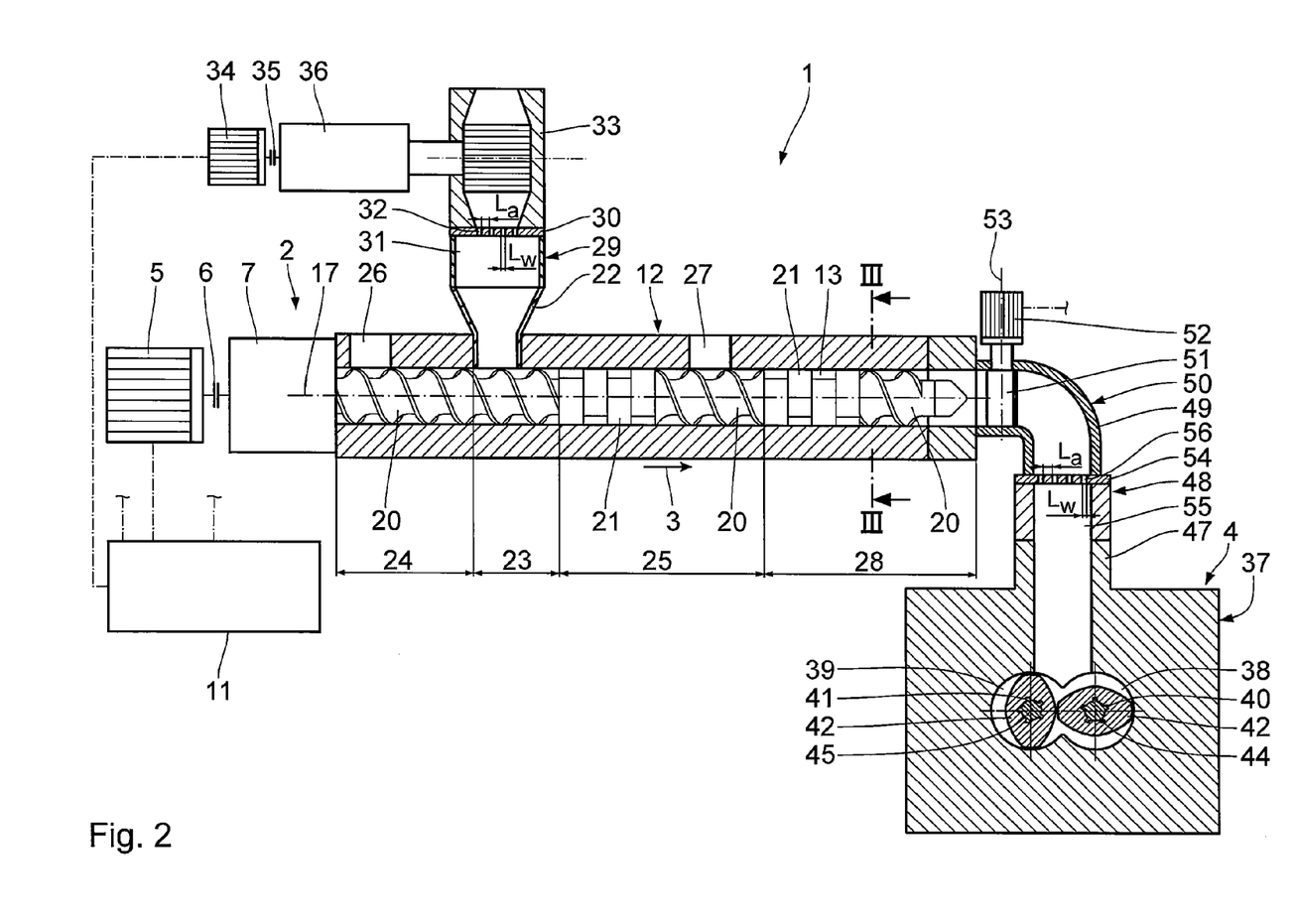
FIG. 2 is a side view of the processing installation according to arrow II in FIG. 1 with extruders being shown in a cutaway view.

The first extruder 2 has a supply funnel 22 which is adjoined by an inlet zone 23 comprising screw members 20 when seen in the direction of conveyance 3. Upstream and downstream of the inlet zone 23 are arranged first devolatilization zones 24, 25 with associated first devolatilization ports 26, 27. The devolatilization zone 24 where the shafts 15, 16 are provided with screw members 20 is designed as a so-called backwards devolatilization zone and is arranged upstream of the inlet zone 23 in the direction of the gear 7. In contrast thereto, the devolatilization zone 25 where the shafts 15, 16 are provided with kneading members 21 and downstream screw members 20 is designed as a forward devolatilization zone which is downstream of the inlet zone 23 when seen in the direction of conveyance 3. The devolatilization zone 25 is adjoined by a conveyance zone 28 where the shafts 15, 16 are provided with kneading members 21 and downstream screw members 20.

When seen in the direction of conveyance 3, a first devolatilization unit 29 is arranged upstream of the first extruder 2. The devolatilization unit 29 is connected with the supply funnel 22 and is designed as a tubular extrudate devolatilization unit. The devolatilization unit 29 comprises a first perforated plate 30 and a first clearance 31 disposed downstream in a direction of conveyance 3. The perforated plate 30 is arranged upstream of the clearance 31 in the direction of gravity. The perforated plate 30 comprises a plurality of first perforations 32 having a perforation width $L_W$ of 0.1 to 20 mm and a perforation distance $L_a$ of 0.1 to 50 mm.

In the direction of conveyance 3, a melt pump 33 is arranged upstream of the devolatilization unit 29 which is designed as a gear pump and is driven by a third drive motor 34 via a third clutch 35 and a third gear 36. The drive motor 34 is actuated by means of the control unit 11.

Figure 4:
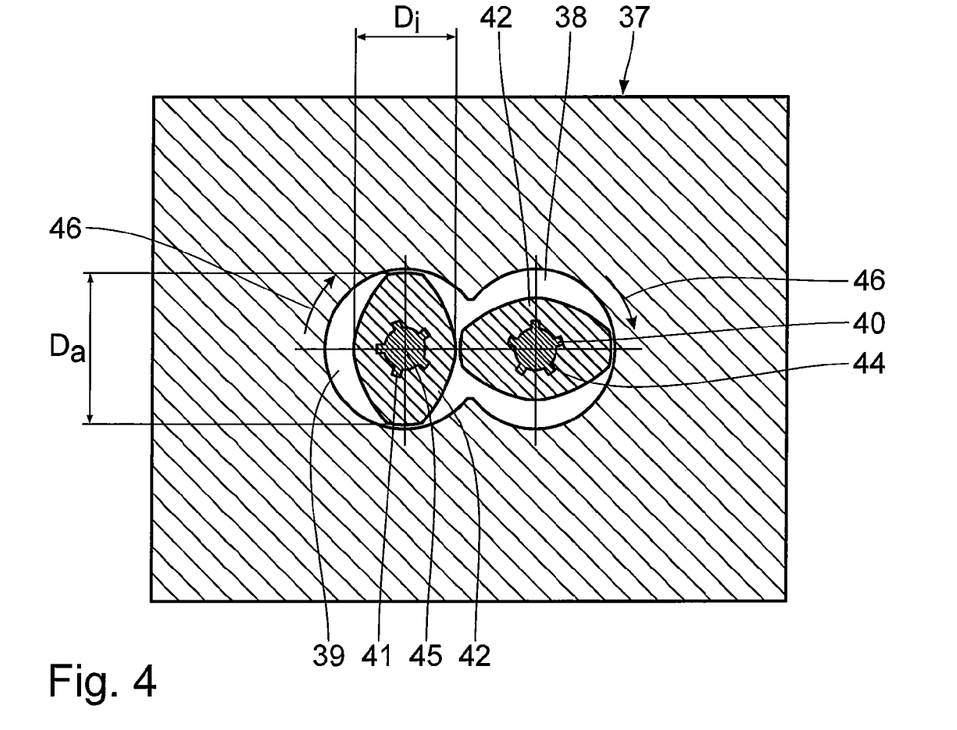
FIG. 4 is a cross-section through a second extruder according to cutting line IV-IV in FIG. 1.

The second extruder 4 also comprises a casing 37 where two second casing bores 38, 39 are formed which are parallel to each other and intermesh with each other in the manner of a lying figure eight. In these casing bores 38, 39, two second shafts 40, 41 are arranged which are coupled to the second gear 10. The second shafts 40, 41 are provided with second treatment members in the form of second screw members 42 and second kneading members 43. The shafts 40, 41 are driven equidirectionally, in other words in the same direction of rotation 46, about parallel second axes of rotation 44, 45. The second treatment members 42, 43 are designed such as to closely intermesh with each other and are self-cleaning. The treatment members 42, 43 have a second core diameter $D_i$ and a second external diameter $D_a$.

The second extruder 4 comprises a supply connection 47 downstream of the second gear 10 when seen in the direction of conveyance 3, the supply connection 47 being connected to the conveyance zone 28 of the first extruder 2 via a second devolatilization unit 48 and a pipe elbow 49. The devolatilization unit 48 is arranged downstream of the pipe elbow 49 in the direction of conveyance 3. The devolatilization unit 48 and the pipe elbow 49 form a transfer zone 50 which interconnects the extruders 2, 4. At an end of the pipe elbow 49 facing the first extruder 2, an adjustable throttle 51 is arranged in the transfer zone 50 which is pivotable about an axis of rotation 53 by means of a throttle drive motor 52 in such a way that the free pipe cross-section of the pipe elbow 49 is adjustable. The throttle drive motor 52 is actuated by means of the control unit 11. The second devolatilization unit 48 is arranged downstream of the throttle 51 in the direction of conveyance 3.

The second devolatilization unit 48 is also designed as a tubular extrudate devolatilization unit. The devolatilization unit 48 comprises a second perforated plate 54 with a second clearance 55 arranged downstream in the direction of conveyance 3. The second perforated plate 54 comprises a plurality of second perforations 56 which have a perforation width $L_W$ and a perforation distance $L_a$ corresponding to the perforations 32 of the first perforated plate 30.

The supply connection 47 is adjoined by an inlet zone 57 in the direction of conveyance 3 where the second shafts 40, 41 are provided with screw members 42. Upstream and downstream of the inlet zone 57 are arranged several second devolatilization zones 58, 59, 60 with associated second devolatilization ports 61, 62, 63. The devolatilization zone 58 is a so-called backwards devolatilization zone and is arranged upstream of the inlet zone 57 in the direction of the second gear 10. In the devolatilization zone 58, the second shafts 40, 41 are provided with screw members 42. The devolatilization zones 59, 60 are designed as forward devolatilization zones, with the second shafts 40, 41 in each case being provided with kneading members 43 and downstream screw members 42.

The control unit 11 is configured such that when the processing installation 1 is in operation, a speed $n_2$ of the second shafts 40, 41 is lower than a speed $n_1$ of the first shafts 14, 15. The external diameter $d_a$ of the first treatment members 20, 21 is smaller than or equal to the external diameter $D_a$ of the second treatment members 42, 43. The ratio of the external diameters $d_a$ to $D_a$ is such that $0.3 \leq d_a/D_a \leq 1.0$, in particular $0.3 \leq d_a/D_a \leq 0.8$, and in particular $0.5 \leq d_a/D_a \leq 0.8$. The diameter ratio $d_a/d_i$ of the first treatment members 20, 21 is such that $1.4 \leq d_a/d_i \leq 2.1$. Correspondingly, the diameter ratio $D_a/D_i$ of the second treatment members 42, 43 is such that $1.4 \leq D_a/D_i \leq 2.1$.

The processing installation 1 is used for devolatilizing liquid polymer melts. Polymer melts include both polymer solutions and polymer suspensions. The polymer melts are supplied to the processing installation 1 from a polymerization reactor and contain large amounts of undesirable low-molecular or volatile components such as non-reacted monomers, oligomers, additives required for polymerization, in particular suspending agents or solvents, and/or by-products or reaction products.

The polymer melt is supplied under pressure to the first devolatilization unit 29 by means of the first melt pump 33. Prior to entering the first devolatilization unit 29, the polymer melt contains an amount of volatile components of for example 10 to 80 wt %. In the devolatilization unit 29, the polymer melt is pressed through the perforations 32 of the perforated plate 30 in such a way that extrudates of polymer melt are formed in the clearance 31 which have a greater surface area than the polymer melt prior to passing through the perforated plate 30. The changed larger surface area allows low-molecular components to be released from the polymer melt and to escape from the devolatilization unit 29 and the first extruder 2 via the devolatilization port 26 of the devolatilization zone 24. The control unit 11 actuates the drive motors 5 and 34 in such a way that the clearance 31 is no more than partially filled, thus allowing the mentioned extrudates of polymer melt to form.

Having been discharged from the devolatilization unit 29, the polymer melt is supplied to the first extruder 2. The control unit 11 actuates the drive motor 5 in such a way that the first shafts 15, 16 are driven equidirectionally at a substantially constant first speed $n_1$ of 200 to 1800 $min^{-1}$, in particular of 300 to 1500 $min^{-1}$, and in particular of 400 to 1200 $min^{-1}$. The polymer melt is conveyed through the inlet zone 23, the devolatilization zone 25 and the conveyance zone 28 in the direction of conveyance 3; in this process, the surface area of the polymer melt is changed continuously by means of the first treatment members 20, 21, in particular the first kneading members 21, allowing volatile components to be released from the polymer melt and to escape through the devolatilization ports 26, 27. The resulting energy loss is reintroduced into the polymer melt by means of the kneading members 21; the energy input is adjustable and controllable at constant speed $n_1$ of the first shafts 15, 16 by means of the adjustable throttle 51. The polymer melt has a lower viscosity, in other words it is fluid, when entering the first extruder 2 so another function of the throttle 51 is to prevent the polymer melt from exiting the first extruder 2 too quickly because of the low viscosity.

The release of the low-molecular components results in an increase of the viscosity of the polymer melt, in other words the polymer melt becomes more viscous. When exiting the first extruder 2, the polymer melt for example contains an amount of volatile components of 2 to 20 wt %. In the conveyance zone 28, a pressure increase occurs so that the polymer melt is supplied under pressure to the second devolatilization unit 48. The mode of operation of the second devolatilization unit 48 corresponds to that of the first devolatilization unit 29. Volatile components released from the polymer melt may escape via the devolatilization port 61 of the devolatilization zone 58. Alternatively, the devolatilization units 29, 48 may be provided with integrated devolatilization ports. The control unit 11 actuates the drive motor 8 in such a way that the second clearance 55 is no more than partially filled, thus allowing the extrudates of polymer melt to form.

Having been discharged from the second devolatilization unit 48, the polymer melt is supplied to the second extruder 4 substantially without pressure. Due to the higher viscosity of the polymer melt, the control unit 11 actuates the drive motor 8 in such a way that the second shafts 41, 41 are driven at a second speed $n_2$ which is lower compared to the first speed $n_1$. As the throughput of the extruders 2 and 4 needs to be substantially equal after removal of the amounts of the volatile or devolatilized components, the second extruder 4 is operated at a second speed $n_2$ depending on the external diameter ratio $d_a/D_a$ which is at least three times, in particular at least four times, and in particular at least five times lower than the first speed $n_1$. The control unit 11 actuates the drive motor 8 in such a way that the second shafts 40, 41 are driven at a second speed $n_2$ of 20 to 600 $min^{-1}$, in particular of 50 to 450 $min^{-1}$, and in particular of 100 to 300 $min^{-1}$. The lower speed $n_2$ prevents thermal damages to the polymer melt in the second extruder 4 due to the higher viscosity and the resulting higher energy input. The speed of the second shafts 40, 41 is preferably controlled or regulated.

In the second extruder 4, the polymer melt is conveyed through the inlet zone 57 and the second devolatilization zones 59, 60 in the direction of conveyance 3. In the devolatilization zones 59, 60, the surface area of the polymer melt is continuously changed and renewed by means of the treatment members 42, 43, in particular the kneading members 43, thus allowing volatile components which are still present in the polymer melt to be released therefrom and to escape via the devolatilization ports 61, 62, 63. The resulting energy loss is reintroduced into the polymer melt by means of the treatment members 42, 43.

Having been discharged from the second extruder 4, the polymer melt contains an amount of low-molecular components of for example less than 10000 ppm and in particular less than 5000 ppm. The two-stage design of the processing installation 1 therefore allows a high devolatilization performance and a high polymer throughput to be achieved at the same time. At an external diameter $d_a$=133 mm and a speed $n_1$=600 $min^{-1}$ and an external diameter $D_a$=250 mm and a speed $n_2$=200 $min^{-1}$, the polymer throughput is approximately 4 to 6 t/h. For example, the processing installation 1 allows devolatilization of a polymer suspension of PMMA (polymethylmethacrylate) and methylmethacrylate with a proportion of 50 wt %. Another suitable material for devolatilization is synthetic rubber such as a polymer solution of styrol-butadiene-rubber with a proportion of hexane and/or cyclohexane as solvent of 20 to 90 wt %.

Figure 5:
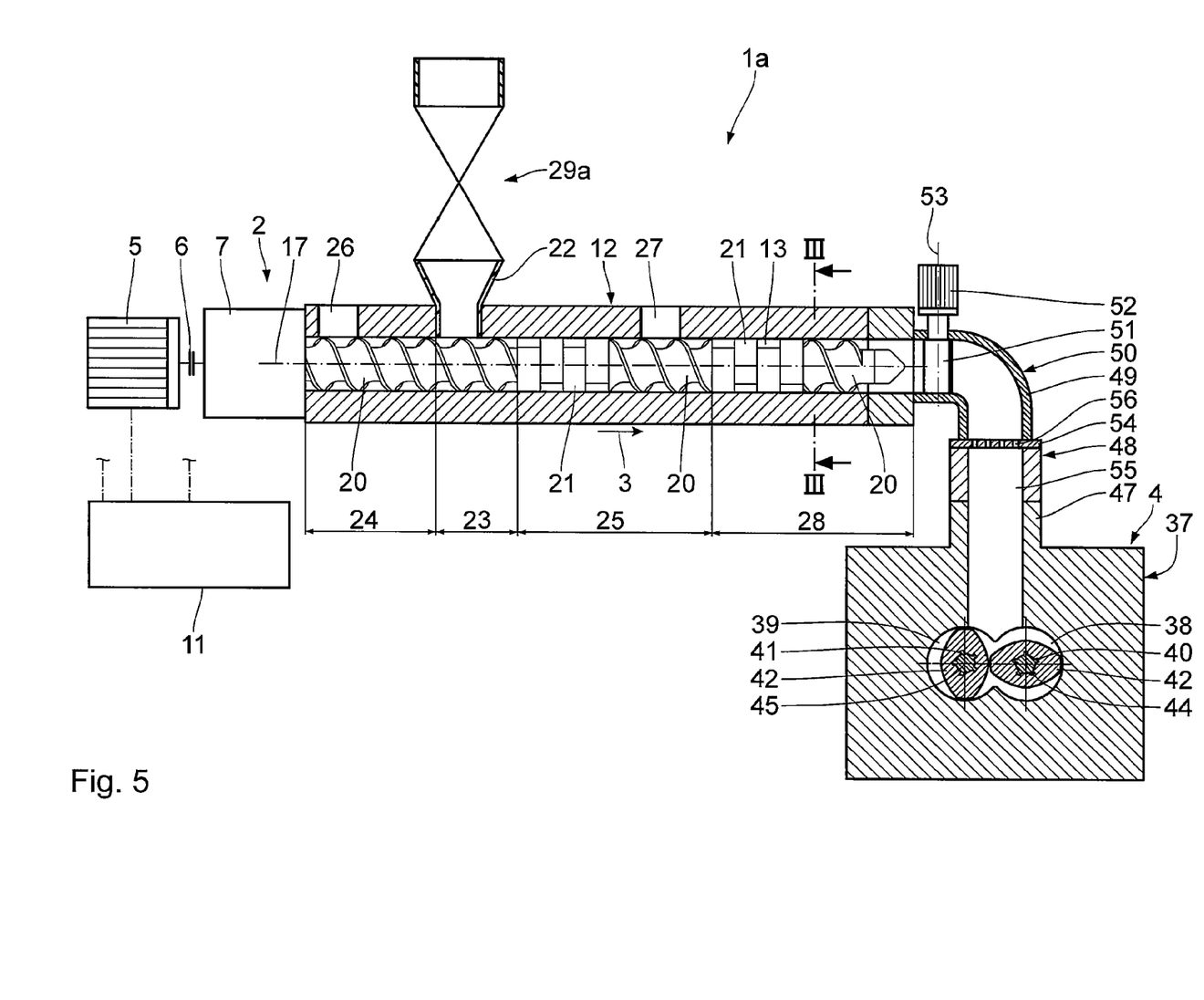
FIG. 5 is a side view corresponding to FIG. 2 of a processing installation according to a second embodiment.

The following is a description, with reference to FIG. 5, of a second embodiment of the invention. Identically designed parts have the same reference numeral as in the first embodiment to the description thereof reference is made. Differently designed parts having the same function have the same reference numeral, followed by the letter a. The main difference to the first embodiment is that the first devolatilization unit 29*a* is a pressure relief unit, with the result that the polymer melt is pressure-relieved when passing through the devolatilization unit 29*a* and volatile components are separated from the polymer melt. A devolatilization unit 29*a* of this type is also referred to as flash valve and is shown in a schematic illustration in FIG. 5. The design of the devolatilization unit 29*a* is generally known and common practice. Supply of the polymer melt may occur corresponding to the first embodiment using a melt pump 33. With respect to the further mode of operation, reference is made to the first embodiment.

Figure 6:
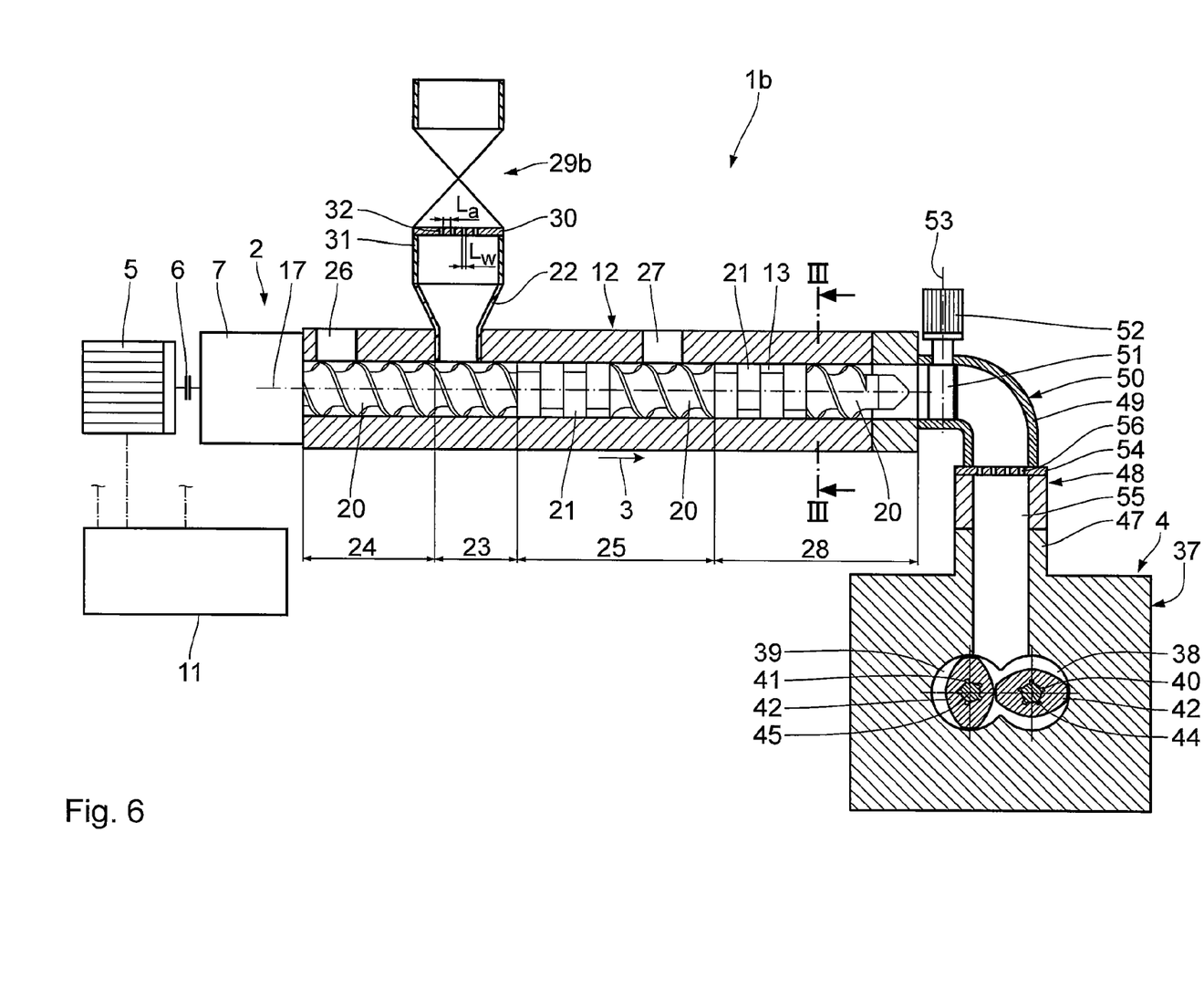
FIG. 6 is a side view corresponding to FIG. 2 of a processing installation according to a third embodiment.

The following is a description, with reference to FIG. 6, of a third embodiment of the invention. Identically designed parts have the same reference numeral as in the first embodiment to the description thereof reference is made. Differently designed parts having the same function have the same reference numeral, followed by the letter b. The main difference to the first embodiment is that the first devolatilization unit 29*b* comprises a pressure relief unit in the form of a flash valve in addition to the extrudate devolatilization unit formed by the perforated plate 30 and the clearance 31. The flash valve is shown in a schematic illustration in FIG. 6. With respect to the design and mode of operation of the flash valve, reference is made to the second embodiment. When passing through the devolatilization unit 29b, the polymer melt is pressure-relieved when entering the extrudate devolatilization unit, which results in an optimum separation of volatile components from the polymer melt. Supply of the polymer melt may occur corresponding to the first embodiment using a melt pump 33. With respect to the further mode of operation, reference is made to the preceding embodiments.

What is claimed is:

1. A method for the devolatilization of polymer melts comprising the following steps:
    providing a processing installation (1; 1a; 1b) comprising
        a first extruder (2) which comprises
            several rotatably drivable first shafts (15, 16) which are provided with first treatment members (20, 21); and
            several first devolatilization zones (24, 25) with first devolatilization ports (26, 27);
        a second extruder (4) arranged downstream of the first extruder (2) in a direction of conveyance (3) which comprises several rotatably drivable second shafts (40, 41) which are provided with second treatment members (42, 43), with the external diameter ($d_a$) of the first treatment members (20, 21) being no more than equal to the external diameter ($D_a$) of the second treatment members (42, 43); and
            several second devolatilization zones (58, 59, 60) with second devolatilization ports (61, 62, 63);
        a transfer zone (50) which interconnects the extruders (2, 4);
        a devolatilization unit (48) which is arranged in the transfer zone (50); and
        an adjustable throttle (51) which is upstream of the devolatilization unit (48) in the direction of conveyance (3) and arranged in the transfer zone (50);
    supplying a polymer melt to the first extruder (2), with the first extruder (2) being operated at a first speed ($n_1$) of the first shafts (15, 16) in such a way that volatile components escape from the polymer melt via the first devolatilization ports (26, 27) so that the polymer melt becomes more viscous;
    adjusting the energy input into the polymer melt in the first extruder (2) using the throttle (51);
    supplying the more viscous polymer melt under pressure to the devolatilization unit (48) which comprises a perforated plate (54) and a clearance (55) arranged downstream in the direction of conveyance (3) so that the polymer melt has a larger surface area in the no more than partially filled clearance (55) after passing through the perforated plate (54) and other volatile components escape from the polymer melt; and
    supplying the polymer melt being discharged from the devolatilization unit (48) to the second extruder (4), with the second extruder (4) being operated at a second speed ($n_2$) of the second shafts (40, 41), which is lower than the first speed ($n_1$), in such a way that other volatile components escape from the polymer melt via the second devolatilization ports (61, 62, 63).

2. A method according to claim 1, wherein the polymer melt is supplied under pressure to another devolatilization unit (29; 29a; 29b) prior to entering the first extruder (2).

3. A method according to claim 2, wherein the pressure for supplying the polymer melt is generated using a melt pump (33) which is arranged upstream of the other devolatilization unit (29; 29a; 29b).

4. A method according to claim 2, wherein the other devolatilization unit (29; 29b) comprises a perforated plate (30) and a clearance (31) arranged downstream in the direction of conveyance (3) so that the polymer melt has a larger surface area in the no more than partially filled clearance (31) after passing through the perforated plate (30) and volatile components are separated from the polymer melt.

5. A method according to claim 2, wherein the other devolatilization unit (29a; 29b) is designed as a pressure-relief unit for the polymer melt to be pressure-relieved when passing through the devolatilization unit (29a; 29b) and low-molecular components to be separated from the polymer melt.

6. A method according to claim 1, wherein the volatile components separated in the at least one devolatilization unit (29, 48; 29a, 48; 29b; 48) escape via a devolatilization port (26, 61) of one of the devolatilization zones (24, 58).

7. A method according to claim 1, wherein the second speed ($n_2$) is at least three times lower than the first speed ($n_1$).

8. A method according to claim 1, wherein the second speed ($n_2$) is at least four times lower than the first speed ($n_1$).

9. A method according to claim 1, wherein the second speed ($n_2$) is at least five times lower than the first speed ($n_1$).

10. A method according to claim 1, wherein the first shafts (15, 16) are driven at a first speed ($n_1$) of 200 to 1800 $min^{-1}$.

11. A method according to claim 1, wherein the first shafts (15, 16) are driven at a first speed ($n_1$) of 300 to 1500 $min^{-1}$.

12. A method according to claim 1, wherein the first shafts (15, 16) are driven at a first speed ($n_1$) of 400 to 1200 $min^{-1}$.

13. A method according to claim 1, wherein the second shafts (40, 41) are driven at a second speed ($n_2$) of 20 to 600 $min^{-1}$.

14. A method according to claim 1, wherein the second shafts (40, 41) are driven at a second speed ($n_2$) of 50 to 450 $min^{-1}$.

15. A method according to claim 1, wherein the second shafts (40, 41) are driven at a second speed ($n_2$) of 100 to 300 $min^{-1}$.

16. A method according to claim 1, wherein the ratio of the external diameter ($d_a$) of the first treatment members (20, 21) to the external diameter ($D_a$) of the second treatment members (42, 43) is such that $0.3 \leq d_a/D_a \leq 1.0$.

17. A method according to claim 1, wherein the ratio of the external diameter ($d_a$) of the first treatment members (20, 21) to the external diameter ($D_a$) of the second treatment members (42, 43) is such that $0.3 \leq d_a/D_a \leq 0.8$.

18. A method according to claim 1, wherein the ratio of the external diameter ($d_a$) of the first treatment members (20, 21) to the external diameter ($D_a$) of the second treatment members (42, 43) is such that $0.5 \leq d_a/D_a \leq 0.8$.

19. A method according to claim 1, wherein at least one of the first shafts (15, 16) and the second shafts (40, 41) are driven equidirectionally.

20. A processing installation for devolatilization of polymer melts comprising
    a first extruder (2) which comprises
        several rotatably drivable first shafts (15, 16) which are provided with first treatment members (20, 21); and
        several first devolatilization zones (24, 25) with first devolatilization ports (26, 27) for volatile components contained in a polymer melt;
    a second extruder (4) arranged downstream of the first extruder (2) in a direction of conveyance (3), which second extruder (4) comprises
        several rotatably drivable second shafts (40, 41) which are provided with second treatment members (42, 43), with the external diameter ($d_a$) of the first treatment members (20, 21) being no more than equal to the external diameter ($D_a$) of the second treatment members (42, 43); and several second devolatilization zones (58, 59, 60) with second devolatilization ports (61, 62, 63) for other volatile components contained in the polymer melt;

a transfer zone (50) which interconnects the extruders (2, 4);

a devolatilization unit (48) which is arranged in the transfer zone (50) and comprises a perforated plate (54) and a clearance (55) arranged downstream in the direction of conveyance (3);

a control unit (11) which is configured in such a way that a second speed ($n_2$) of the second shafts (40, 41) is lower than a first speed ($n_1$) of the first shafts (14, 15); and a throttle (51) which is arranged in the transfer zone (50) upstream of the devolatilization unit (48) when seen in the direction of conveyance (3), with the position of the throttle (51) being adjustable by means of the control unit (11).

21. A processing installation according to claim 20, wherein another devolatilization unit (29; 29a; 29b) is arranged upstream of the first extruder (2) in the direction of conveyance (3).

* * * * *